Nov. 8, 1938.                R. S. BAKER                2,135,488
                              SAW GUIDE
                          Filed Aug. 3, 1936
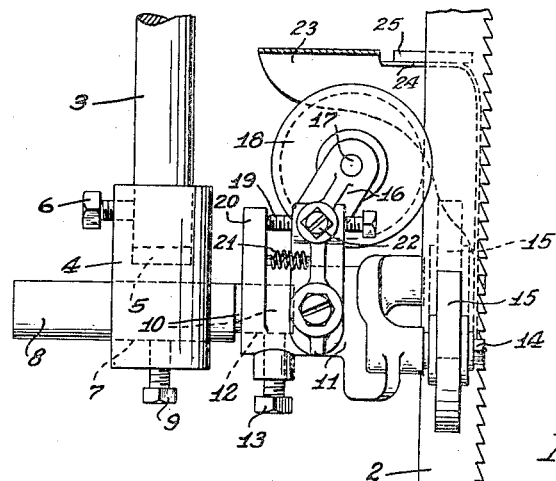
Fig. 1.
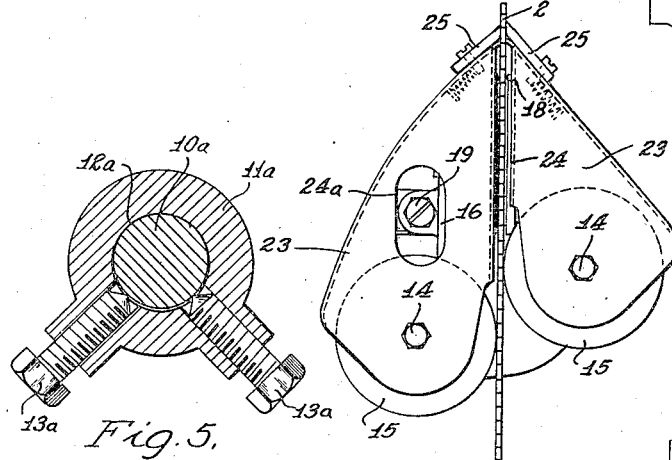
Fig. 2.
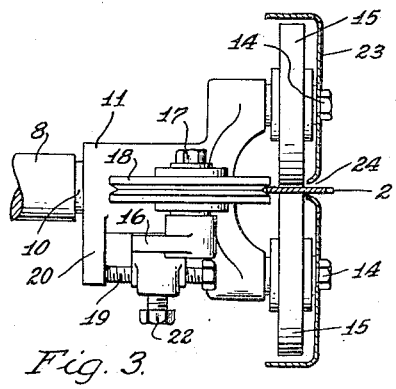
Fig. 5.
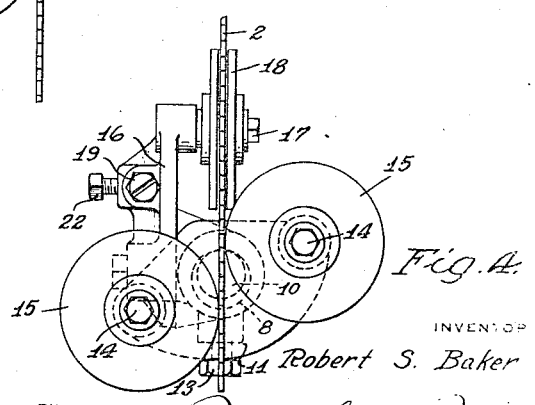
Fig. 3.                                                 Fig. 4.
INVENTOR
Robert S. Baker Patented Nov. 8, 1938

2,135,488

UNITED STATES PATENT OFFICE 2,135,488

SAW GUIDE

Robert S. Baker, Detroit, Mich.

Application August 3, 1936, Serial No. 94,037

3 Claims. (Cl. 143—162)

This invention relates to band saw guides and has as its primary object to provide means for supporting and guiding a band saw blade in such manner as to insure efficient operation of the saw. That is, the present device is designed to support a band saw blade whereby to provide for clean, regular cutting operations and also to prevent blade distortions which cause binding of the blade in the work and the damage which results to the blade when such binding occurs.

Another object of the present invention is to provide a band saw guide embodying three guide rolls, two of the rolls being adjustably supported whereby they engage opposite sides of the blade, and the third roll being adjustably supported to engage the rear edge of the blade, the adjustability of all of said rolls permitting the guide means thus provided to be adjusted to accommodate blades of different thicknesses and widths.

Another object of the present invention is to provide guide means of the character above referred to wherein the two rolls which engage opposite sides of the blade are so arranged that any obstruction between one of the rolls and the saw blade will not bind the blade or oppose movement thereof. To this end, the rolls which engage opposite sides of the blade are staggered, rather than being directly opposed, so that in case an obstruction becomes lodged between a roll and the saw blade the latter may spring away from the roll in order to permit the obstruction to pass therebetween. With a vertically travelling blade the two rolls are mounted in different vertical planes, that is, one engages the blade at a higher point than the other, and this feature in addition to the advantage referred to above, is advantageous from the standpoint that it also provides for a simple and inexpensive means for adjusting the rolls to accommodate blades of different thickness. By mounting the roll support so that it may be moved rotatively about an axis parallel to the axis of the rolls and in a vertical plane intermediate the axis of the rolls the vertical spacing of the rolls may be adjusted by such rotative movement of the support to accommodate blades of different thickness.

Another object of the present invention is to provide a band saw guide of the character referred to above which includes a protective guard or shield, the parts of the guide and shield being so constructed and arranged that the various adjustments of which the guide is capable may be made without removing the shield.

Another object of the present invention is to provide a band saw guide of the character referred to above embodying means for supporting the several guide rolls and for bodily moving the same in both horizontal and vertical planes in order that the guide may be properly positioned with respect to the saw blade. Initially, the rolls of the guide may be adjusted to accommodate the width and thickness of a particular blade and the adjustment means here referred to permits the rolls when so adjusted to be placed in a position whereby they support the blade properly.

In cutting certain types of work, plaster for example, a film or layer becomes deposited upon and adheres to the surface of the saw blade. Accordingly it is another object of the present invention to provide means for scraping or brushing such film or layer from the surface of the blade.

With the above and other objects in view the invention is more fully described with reference to the accompanying drawing, in which Figure 1 is a side elevation of a guide unit with the guard or shield broken away and in section;

Fig. 2 is a front elevation;

Fig. 3 is a top plan with the guard in section;

Fig. 4 is a front elevation with the guard entirely removed, and

Fig. 5 is a section of a modified detail.

Like characters of reference are employed throughout to designate corresponding parts.

Band saws are already well known in the art and for that reason the means for supporting and driving the band saw has not been illustrated here. Conventional band saws include a work supporting table, such as indicated on the drawing at 1, and a saw blade which is moved through a slot in the table so that work upon the table may be moved into engagement therewith. A fragment of the saw blade is indicated at 2. Attention is also called to the fact that guide means is ordinarily provided for the saw blade both above and below the work table and although the present disclosure shows guide means above the work table only it contemplates that guide means will also be provided below the table. The present guide means, to be described in detail, may be used both above and below the table, and because showing the same below the table would amount to duplication of the unit as shown above the table its installation is deemed obvious to those skilled in the art and illustration thereof is deemed unnecessary.

The guide unit comprises a vertical support 3 in the form of a shaft, the support 3 being attached to a stationary part (not shown) adjacent the band saw. Obviously, the stationary part might comprise a portion of the band saw frame. A body 4 has an axial bore 5 receiving the end of the shaft 3 and carries a set screw 6 whereby its end engages the shaft 3 to retain its end in the body 4. Extending transversely of the body 4 is a bore 7 receiving a cylindrical element 8, a set screw 9 being mounted in the body 4 whereby its end engages the cylindrical element 8 to prevent rotative and lengthwise movement thereof in the bore 7. On the projecting end of the cylindrical element 8 is formed an eccentric journal 10.

A bracket 11 is provided with a centrally disposed bearing 12 which receives the journal 10 and with a set screw 13 which engages the journal 10 to prevent relative rotation between the journal and the bracket. Mounted in the bracket 11 are two spindles 14 located in vertical planes on opposite sides of the axis of the bearing 12, the vertical planes of the spindles being an equal distance from a vertical plane intersecting the axis of the bearing 12. As illustrated, however, one of the spindles 14 is mounted in a plane higher than the other. Each spindle rotatably supports a roller 15.

Pivotally mounted upon a side of the bracket 11 is an adjustable arm 16, the outer end of the arm carrying a spindle 17 upon which a roller 18 is rotatably mounted. Mounted in the arm 16 is a set screw 19 whose end engages a lug 20 on the bracket 11, a spring 21 being connected to the lug 20 and the arm 16 to maintain such contact. In order to maintain the set screw 19 in various positions of adjustment, or in other words against accidental displacement, a second set screw 22 is mounted in the arm so that it may be tightened into engagement with the set screw 19.

A sheet metal shield 23 has a slot 24 therein through which the saw blade 2 operates and a slot 24a through which access may be had to the set screw 19, the shield being supported by the spindles 14 which support the rolls 15. The shield 23 is preferably of tapered form so that when it is placed beneath the work table it may be placed in close proximity thereto without interfering with angular adjustments of the work table. The shield also provides a support for brushes 25 which are spring pressed into engagement with the sides of the blade 2 to keep it clean.

In assembling the present guide means and adjusting its position with respect to the saw blade 2 vertical adjustments may be made by loosening the set screw 6 to permit movement of the body 4 with respect to the shaft 3. The bracket 11 may be adjusted laterally in order to bring its center in direct alignment with the center of the blade 2 by loosening the set screw 9 and rotating the cylindrical element 8. Such rotation of the cylindrical element 8 moves the eccentric ground 10 on the end thereof laterally. After the bracket 11 has been properly positioned with respect to the saw blade 2 the bracket 11 is moved rotatively on the journal 10 until the rolls 15 are in light contact with opposite sides of the blade 2. Finally, the arm 16 is adjusted by means of the set screw 19 until the roll 18 is in light contact with the rear edge of the blade. The roll 18 is preferably provided with a V-shaped groove for the reception of the blade.

With the several rolls adjusted so that they contact lightly with the blade 2 while the latter is in its normal inoperative position they will maintain the blade in such a position after the blade is placed in motion and work forced into engagement therewith. In the event that cut particles of work, chips, or other obstructions become lodged between one of the rolls 15 and the blade 2 they will not become jammed therein inasmuch as the staggered relation of the rolls 15 permits the saw blade to flex sufficiently to pass the obstruction therebetween. Obstructions which are large enough to require a damaging amount of flexing in the blade are prevented from contacting with the rolls 15 by the shield 23. Furthermore, any materials adhering to the blade surface which might require flexing of the blade in order to pass between the same and the rolls are removed by the brushes 25.

In Fig. 5 there is illustrated a modified means for preventing rotation of the bracket relative to its supporting trunnion. In this view the bracket 11a has two set screws 13a mounted therein with their axes converging. The pointed ends of the set screws engage the trunnion 10a and when tightened crowds the same against the opposite side of the bearing 12a. In cases where a slight clearance is present, such as shown exaggerated in the drawing, the two set screws function to prevent rocking movement of the trunnion with respect to the bearing.

Although a specific embodiment of the invention has been illustrated and described it will be understood that various changes may be made within the scope of the appended claims without departing from the spirit of the invention, and such changes are contemplated.

What I claim is:—

1. In a device of the character described, a bracket, a pair of rolls rotatably supported by said bracket for engagement with opposite sides of a band saw blade, an arm pivotally mounted at its lower end upon said bracket, a roll supported by the upper end of said arm and adapted to engage the rear edge of a band saw blade above the horizontal plane of the axes of said first mentioned rolls, a fixed arm on said bracket, resilient means interposed between said arms and normally urging swinging movement of said pivoted arm away from said blade, and an adjusting screw for restricting said swinging movement and for causing swinging movement of said pivoted arm toward said blade.

2. A guide for a band saw blade comprising a bracket, means centrally disposed with respect to said bracket and supporting said bracket for rotative movement about an axis perpendicular to the direction of travel of the blade, said bracket having a pair of spindles extending parallel with and positioned laterally of said axis and at opposite sides of said blade, and a pair of rolls mounted upon said spindles for engagement with opposite sides of said blade, the axes of said rolls residing in vertical planes equally spaced from the vertical plane of the center of said bracket and with their axes in different horizontal planes, said means for supporting said bracket comprising a rotatable shaft having an eccentric journal upon which said bracket is mounted whereby rotative movement of said rotatable shaft causes lateral shifting of said bracket, an arm pivotally mounted at its lower end upon said bracket and extending upwardly therefrom, a lug on said bracket in opposed relation to said arm, an adjusting screw on said arm intermediate its ends to engage said lug, means for swinging said arm upon its pivotal support, and a roll upon the upper end of said arm to engage the rear edge of the band saw blade.

3. A guide mechanism for a band saw blade comprising a bracket, means supporting said bracket for lateral adjustment and for rotative movement about an axis perpendicular to the direction of movement of the blade, a pair of rolls, spindles on said bracket projecting outwardly therefrom at opposite sides of said blade and upon which said rolls are mounted in contact with opposite sides of said blade, a sheet metal shield supported at its lower end upon the free ends of said spindles with a vertical wall adjacent the outer side of said rolls and a lateral wall extending thereover, said walls being formed with a slot to receive said blade, whereby said rolls are shielded and said slot in said shield provides a guide to assist in aligning said bracket with said saw and in adjusting said rolls relative thereto.

ROBERT S. BAKER.